(12) United States Patent
Tasaka et al.

(10) Patent No.: US 10,780,921 B2
(45) Date of Patent: Sep. 22, 2020

(54) VEHICLE FRAME STRUCTURE

(71) Applicant: TOYOTA JIDOSHA KABUSHIKI KAISHA, Toyota-shi, Aichi-ken (JP)

(72) Inventors: Sentaro Tasaka, Toyota (JP); Masahiro Onoda, Toyota (JP); Shinya Saito, Toyota (JP); Shumpei Yamada, Aichi-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 6 days.

(21) Appl. No.: 16/375,983

(22) Filed: Apr. 5, 2019

(65) Prior Publication Data

US 2019/0308665 A1   Oct. 10, 2019

(30) Foreign Application Priority Data

Apr. 6, 2018 (JP) .................. 2018-074241

(51) Int. Cl.
| | |
|---|---|
| *B62D 21/02* | (2006.01) |
| *B62D 21/15* | (2006.01) |
| *B62D 27/02* | (2006.01) |
| *B62D 24/02* | (2006.01) |

(52) U.S. Cl.
CPC .......... *B62D 21/152* (2013.01); *B62D 21/02* (2013.01); *B62D 21/15* (2013.01); *B62D 27/02* (2013.01); *B62D 24/02* (2013.01)

(58) Field of Classification Search
CPC ........ B62D 21/02; B62D 21/03; B62D 21/05; B62D 21/07; B62D 21/152; B62D 21/15; B62D 24/02

USPC ............... 296/187.1, 203.05, 203.02, 35.1
See application file for complete search history.

(56) References Cited

U.S. PATENT DOCUMENTS

| | | | | |
|---|---|---|---|---|
| 2010/0327626 | A1* | 12/2010 | Baumann ............... | B62D 21/15 |
| | | | | 296/187.09 |
| 2015/0246690 | A1 | 9/2015 | Matsumoto et al. | |
| 2015/0321700 | A1 | 11/2015 | Onoda et al. | |
| 2015/0344073 | A1* | 12/2015 | Midoun ............... | B62D 21/155 |
| | | | | 296/187.1 |
| 2016/0068191 | A1* | 3/2016 | Kim ..................... | B62D 21/152 |
| | | | | 280/784 |
| 2017/0036699 | A1* | 2/2017 | Asai ..................... | B62D 25/082 |
| 2017/0197661 | A1* | 7/2017 | Nakamoto ........... | B62D 21/152 |
| 2017/0197662 | A1* | 7/2017 | Nakamoto ........... | B62D 21/155 |
| 2017/0217296 | A1* | 8/2017 | Nomura ............... | B62D 23/005 |
| 2018/0201323 | A1* | 7/2018 | Onoda ................. | B62D 21/03 |

(Continued)

FOREIGN PATENT DOCUMENTS

| | | |
|---|---|---|
| JP | 2015-166207 A | 9/2015 |
| JP | 2015-214197 A | 12/2015 |
| JP | 2016-078509 A | 5/2016 |

*Primary Examiner* — Jason S Morrow
(74) *Attorney, Agent, or Firm* — Sughrue Mion, PLLC

(57) ABSTRACT

A vehicle frame structure includes a pair of side rails extending along the length of a vehicle, and outriggers coupled to the side rails, respectively, to protrude further outward in the vehicle width direction with respect to the corresponding side rails. The outrigger includes a cab mounting bracket joined to the side rail. The cab mounting bracket includes a rear end side that is inclined inward in the vehicle width direction as it goes rearward. The cab mounting bracket further includes, in the middle of the rear end, a bent portion which is bent to have a convex shape toward the front of the vehicle.

5 Claims, 7 Drawing Sheets

(56) References Cited

U.S. PATENT DOCUMENTS

| | | | |
|---|---|---|---|
| 2019/0111973 A1* | 4/2019 | Onoda | B62D 21/02 |
| 2020/0023904 A1* | 1/2020 | Asai | B21D 47/01 |
| 2020/0079429 A1* | 3/2020 | Asai | B62D 25/2036 |
| 2020/0079435 A1* | 3/2020 | Asai | B21D 43/00 |

* cited by examiner

VEHICLE FRAME STRUCTURE

CROSS REFERENCE TO RELATED APPLICATION

This application claims priority to Japanese Patent Application No. 2018-074241 filed on Apr. 6, 2018, which is incorporated herein by reference in its entirety including the specification, claims, drawings, and abstract.

TECHNICAL FIELD

The present disclosure relates to a vehicle frame structure including a pair of side rails spaced along the width of a vehicle, and outriggers mounted in the middle of the respective side rails to protrude outward along the vehicle width.

BACKGROUND

Typically, a vehicle frame structure includes a pair of side rails spaced along the width of a vehicle, and cross members crossing between these side rails. The vehicle frame structure often further includes outriggers mounted to the respective side rails to protrude outward along the width. The outrigger is also called a cab mounting bracket. A cab or a body is mounted on the side rails via the outriggers (cab mounting brackets) and a cabin mount.

Frontal crashes that are crashes on the front face of a vehicle include a small overlap crash in which an impacting object collides against a part of (about 25%, for example) the front face of a vehicle. In this small overlap crash, impact load is input to the outrigger. The load input to the outrigger is then transmitted, via the outrigger, to the side rail as diagonally rearward load. At this time, large load input to the outrigger may cause the side rail to be bent inward and deformed. To avoid this, Patent Document 1 listed below proposes a side rail including a reinforcement member called a bulkhead. Inclusion of the bulkhead efficiently prevents breaking of the side rail in a small overlap crash.

CITATION LIST

Patent Literature

Patent Document 1: JP 2016-78509A

SUMMARY

However, a structure including a bulkhead increases weight and costs because of the bulkhead itself. Embodiments of the present disclosure are therefore directed toward a vehicle frame structure that prevents bending of a side rail in a small overlap crash without significantly increasing weight and costs.

In an aspect of the disclosure, a vehicle frame structure includes a pair of side rails extending along a length of a vehicle at an interval in a width direction of the vehicle, and outriggers coupled to the side rails, respectively, to protrude further outward in the vehicle width direction with respect to the respective side rails. The outriggers each include a cab mounting bracket joined to corresponding one of the side rails. The cab mounting bracket includes a rear end side that is inclined inward in the vehicle width direction as the rear end side goes rearward of the vehicle. The cab mounting bracket further includes, in a middle of the rear end side, a bent portion which is bent to be convex toward the front of the vehicle.

This structure allows impact load input to the cab mounting bracket from a forward direction to be concentrated in the bent portion, making a region of the cab mounting bracket near the bent portion easily deformed. Such a deformation near the bent portion absorbs collision energy and therefore reduces load to be transmitted to the side rail. This prevents deformation of the side rail without disposing a reinforcement member in the side rail. It is therefore possible to prevent bending of the side rail in a small overlap crash without significant increase in weight and costs.

In the above structure, each of the side rails may have a substantially crank shape including a rail front portion extending along the length of the vehicle, a rail rear portion disposed further outward in the vehicle width direction with respect to the rail front portion to extend along the length of the vehicle, and a rail slope portion extending diagonally to connect the rail front portion and the rail rear portion. The cab mounting bracket may be joined to the corresponding one of the side rails such that a front end of the cab mounting bracket is positioned near a corner formed by the rail slope portion and the rail rear portion.

The side rail having a substantially crank shape is likely to deform or bend near a corner formed by the rail front portion and the rail slope portion and a corner formed by the rail slope portion and the rail rear portion in a full-wrap collision, thereby absorbing collision energy. Further, the cab mounting bracket, which is placed such that its front end is located near the corner formed by the rail slope portion and the rail rear portion, that is, which is partially joined to the rail rear portion, protrudes largely outward in the vehicle width direction. The cab mounting bracket therefore more reliably receives an impacting object, such as a front-wheel tire, moving rearward in a small offset collision.

The outriggers may each further include an abutting member protruding forward of the vehicle from the front end of the cab mounting bracket.

In a small offset collision of a vehicle including a structure having such an abutting member, an impacting object, such as a front-wheel tire, moving rearward first collides against this abutting member. The impacting object, which has impacted the abutting member, loses balance and is inclined outward in the vehicle width direction. This allows the location of the cab mounting bracket where the impact load is input to be displaced outward in the vehicle width direction with respect to the bent portion. This results in transmission of most of the impact load to the bent portion, to allow the region near the bent portion to be deformed more reliably. As a result, deformation of the side rail can be prevented more reliably.

In this structure, the abutting member may have a center in the vehicle width direction that is located further inward in the vehicle width direction with respect to a center of a front-wheel tire in the vehicle width direction.

This structure allows the front-wheel tire moving rearward of the vehicle in a small offset collision to be easily inclined outward in the vehicle width direction after impacting against the abutting member. This further makes it likely to shift the location on the cab mounting bracket where load is input further outward in the vehicle width direction with respect to the bent portion. As a result, the cab mounting bracket can be deformed easily near the bent portion, thereby preventing deformation of the side rail more reliably.

The outriggers may each further include a load receiving member coupled to the cab mounting bracket. The load receiving member may include a contact plate extending further outward in the vehicle width direction with respect to a front end face of the cab mounting bracket at a location further forward with respect to the front end face.

This structure allows an impacting object, such as a front-wheel tire, moving rearward to easily collide against the outrigger in a small offset collision.

In the vehicle frame structure of the disclosure, impact load input to the cab mounting bracket from a forward direction is concentrated in the bent portion, making a region in the cab mounting bracket near the bent portion easily deformed. Such a deformation near the bent portion absorbs collision energy and therefore reduces load to be transmitted to the side rail, preventing deformation of the side rail without placing a reinforcement member therein. It is therefore possible to prevent bending of the side rail in a small overlap crash without significant increase in weight and costs.

BRIEF DESCRIPTION OF DRAWINGS

An embodiment of the present disclosure will be described by reference to the following figures, wherein.

DESCRIPTION OF EMBODIMENTS

Figure 1:
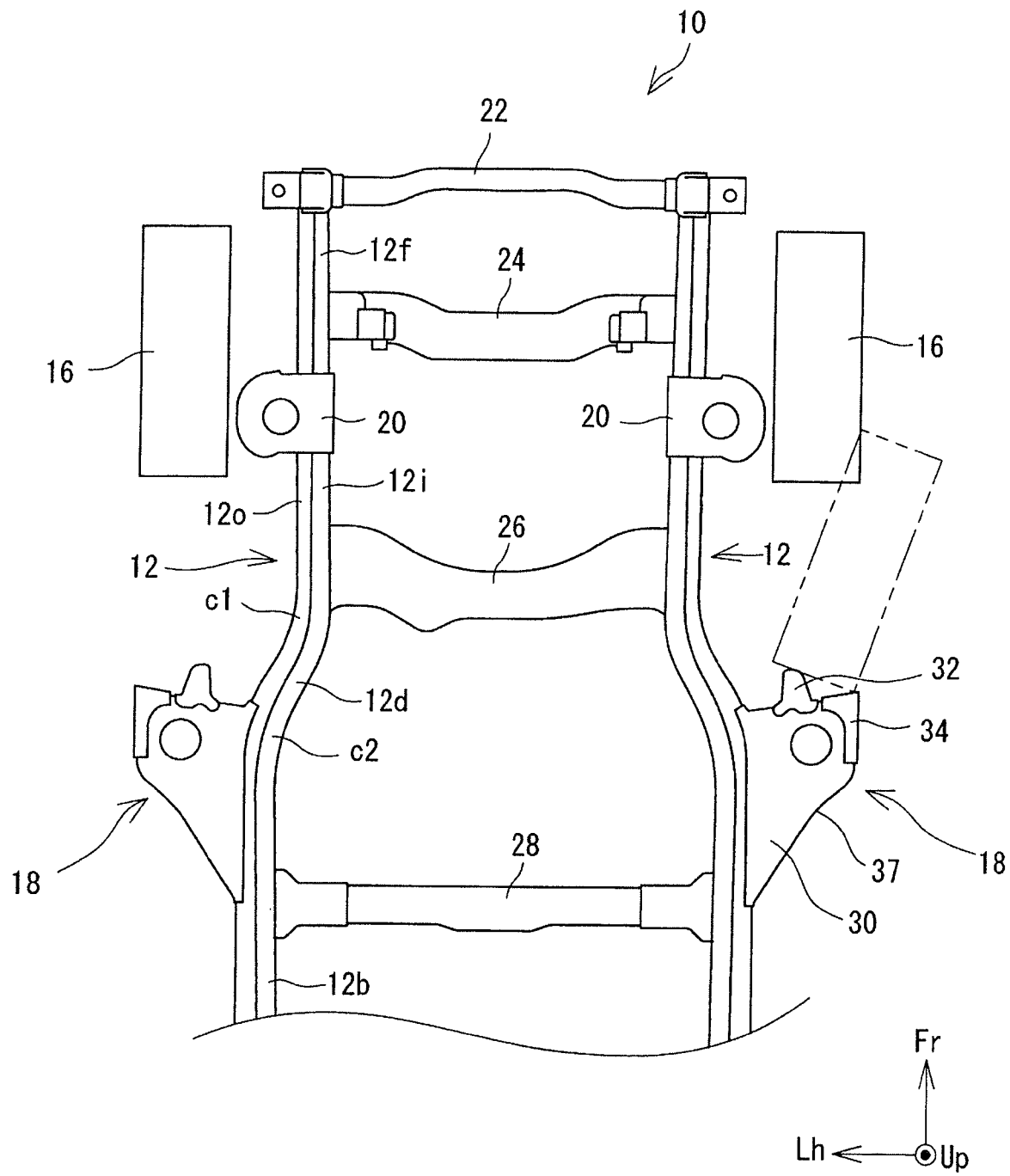
FIG. 1 is a plan view of a vehicle frame structure.

A vehicle frame structure 10 will be described by reference to the drawings. FIG. 1 is a plan view of the vehicle frame structure 10, showing only a frame of significance. In all the drawings, Fr indicates frontward in the length direction of a vehicle, Up indicates upward in the height direction of the vehicle, and Lh indicates leftward in the width direction of the vehicle.

As illustrated in FIG. 1, the vehicle includes a pair of side rails 12 spaced along the width of the vehicle. The side rail 12 is a frame member extending along the length of the vehicle, and includes an outer rail 12$o$ and an inner rail 12$i$ that are joined together. Both the outer rail 12$o$ and the inner rail 12$i$ have a cross section of a substantially C shape, and are made of steel. The outer rail 12$o$ and the inner rail 12$i$ are welded to form a closed section having a substantially rectangular shape, so that the whole side rail 12 has a square pipe shape having a substantially square cross section.

As illustrated in FIG. 1, the side rail 12 is bent outward in the vehicle width direction, in a middle portion along its length. More specifically, the side rail 12 has a substantially crank shape including a rail front portion 12$f$ extending along the length of the vehicle, a rail rear portion 12$b$ located further outward with respect to the rail front portion 12$f$ in the vehicle width direction and extending along the length of the vehicle, and a rail slope portion 12$d$ connecting the rail front portion 12$f$ and the rail rear portion 12$b$. The side rail 12 is bent into a corner at the boundary between the rail front portion 12$f$ and the rail slope portion 12$d$ and a corner at the boundary between the rail slope portion 12$d$ and the rail rear portion 12$b$. In the following description, the corner formed by the rail front portion 12$f$ and the rail slope portion 12$d$ will be referred to as a "first corner c1" and the corner formed by the rail slope portion 12$d$ and the rail rear portion 12$b$ will be referred to a "second corner c2".

The side rail 12, which is bent in the middle of its length as described above, deforms easily in a full-wrap collision in which an impacting object crashes against the entire front face of a vehicle, and such a deformation absorbs collision energy. Specifically, impact load toward the rear of the vehicle which is applied to a front end of the side rail 12 causes the rail front portion 12$f$ to attempt to move rearward against the rail rear portion 12$b$. To enable such a rearward movement of the rail front portion 12$f$, the first corner c1 and the second corner c2 deform by being bent, so that the whole side rail is deformed in an "N" letter. This deformation absorbs the collision energy in a full-wrap collision.

A cross member 22 extending along the width of the vehicle is connected to the front ends of the pair of side rails 12. An impact-absorbing member, such as a crash box, may be disposed between the front end of the side rail 12 and the cross member 22. In a small crash, the impact-absorbing member deforms to absorb the collision energy, so that deformation of the side rail 12 can be prevented. When repairing this structure, replacement of the side rail 12 is not required and only the impact-absorbing member needs to be replaced, which reduces repairing costs.

The vehicle further includes, at the back of the cross member 22, a plurality of cross members 24, 26, and 28 which are spaced rearward along the length of the vehicle. Each of these cross members 24, 26, and 28 is a frame structure extending along the width of the vehicle and crossing across the pair of side rails 12. The cross members 24 and 26 are connected to the rail front portion 12$f$, and the cross member 28 is connected to the rail rear portion 12$b$.

A suspension mounting bracket 20 and an outrigger 18 are connected to each side rail 12. The suspension mounting bracket 20 is a metal bracket mounted on the rail front portion 12$f$ between cross member 24 and the cross member 26 to extend further outward in the vehicle width direction with respect to the rail front portion 12$f$. A suspension mount (not shown) is attached to the suspension mounting bracket 20, and, via the suspension mount and the suspension mounting bracket 20, a suspension unit (not shown) is coupled with the side rail 12. Front-wheel tires 16 are disposed further outward in the vehicle width direction with respect to the respective suspension mounting brackets 20.

Figure 2:
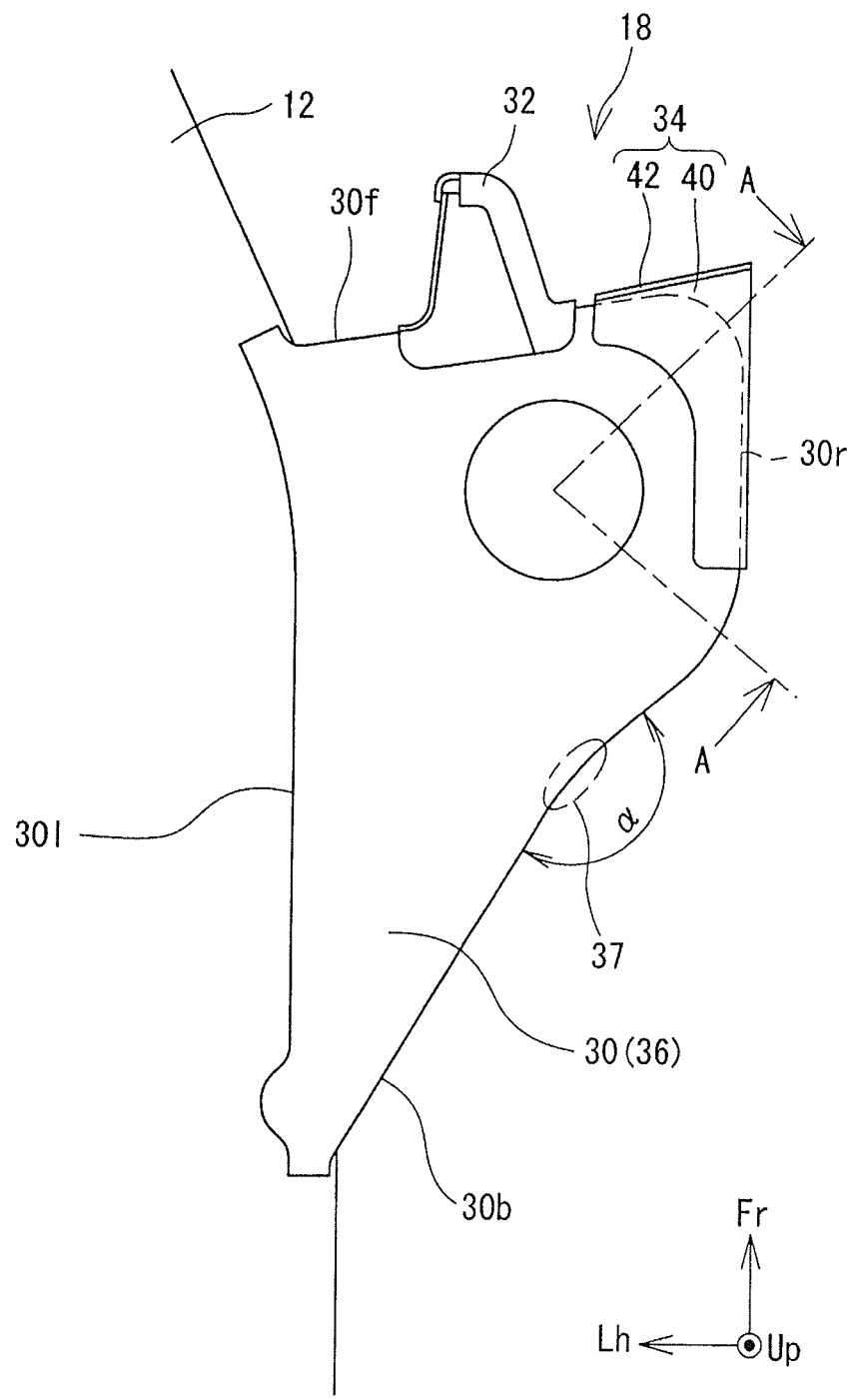
FIG. 2 is a plan view illustrating the periphery of an outrigger.
Figure 3:
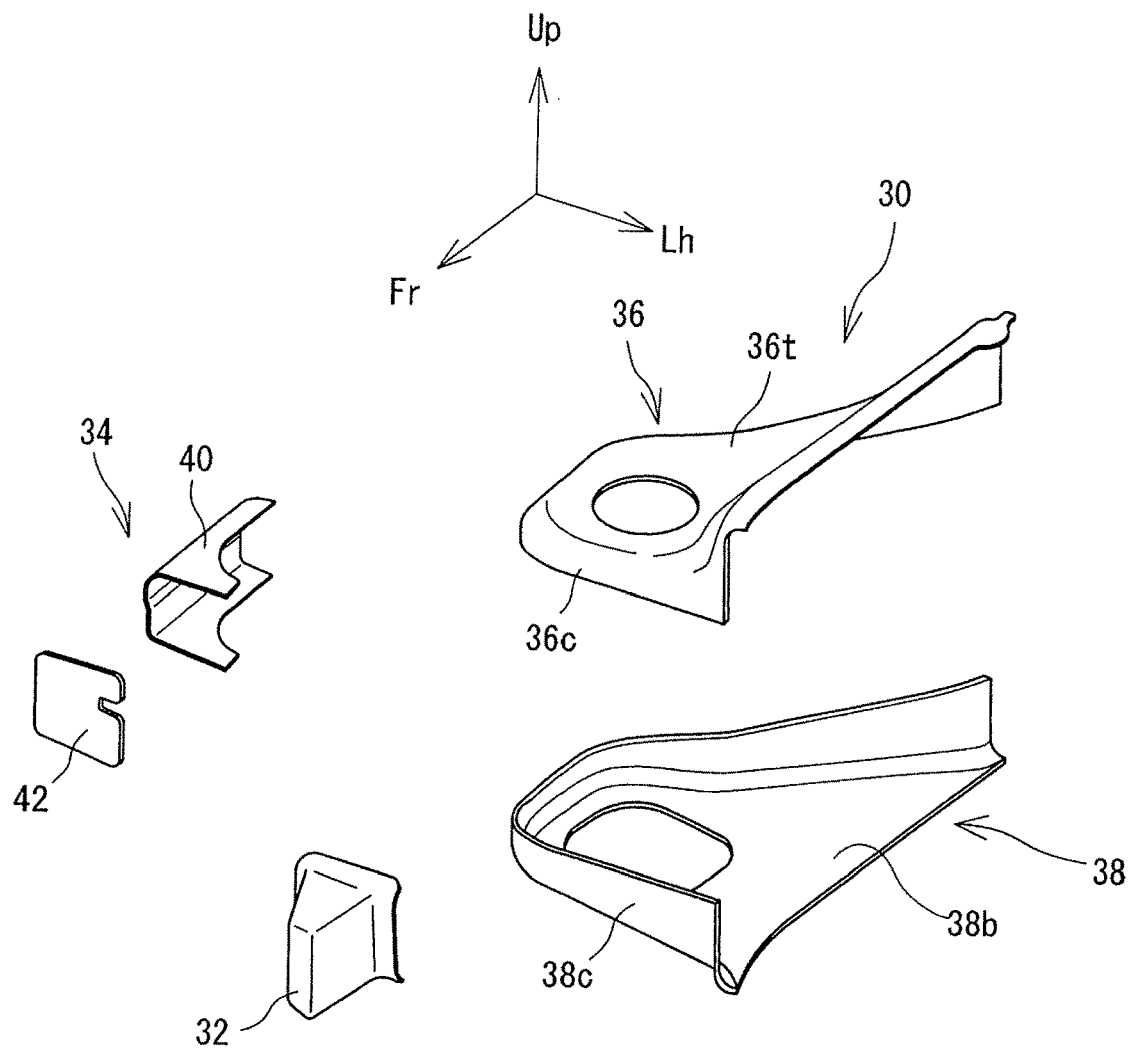
FIG. 3 is an exploded perspective view of the outrigger.
Figure 4:
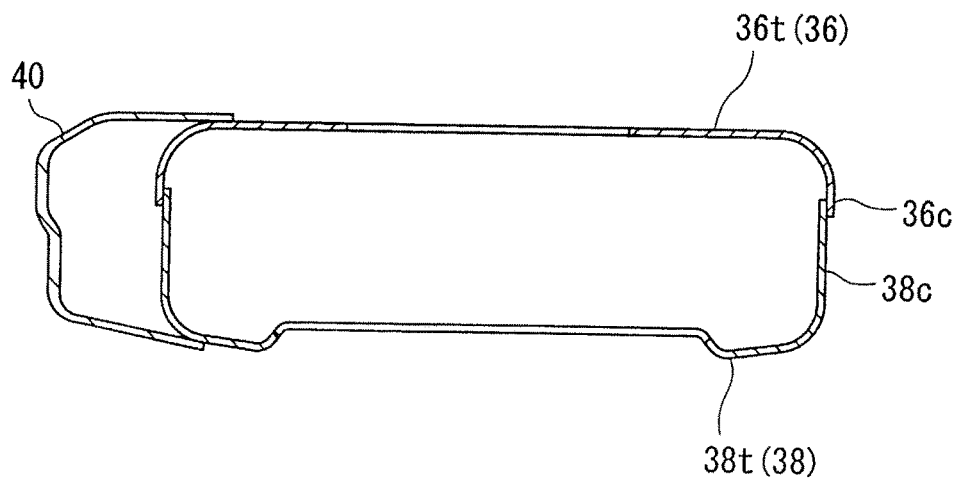
FIG. 4 is a cross sectional view taken along line A-A in FIG. 2.

The outrigger 18 is a metal bracket mounted on each side rail 12 to bridge from the second corner c2 to the rail rear portion 12$b$ and to protrude further outward in the vehicle width direction with respect to the side rail 12 (and also the rail rear portion 12$b$). As the outriggers 18 on the right and left sides have the same configuration, the outrigger 18 on the right side will be described below as an example. FIG. 2 is a plan view illustrating the right outrigger 18 and its periphery and FIG. 3 is an exploded perspective view of the right outrigger 18. FIG. 4 is a cross sectional view taken along line A-A in FIG. 2.

As illustrated in FIGS. 2 and 3, the outrigger 18 includes a cab mounting bracket 30 mounted to the side rail 12, and an abutting member 32 and a load receiving member 34 mounted on the front end of the cab mounting bracket 30. The cab mounting bracket 30 is a metal bracket used for mounting a cab mount which is not shown. A cab or a body, which is not shown, is coupled to the side rail 12 via this cab mounting bracket 30 and the cab mount. While FIGS. 2, 3, and 4 illustrate the cab mounting bracket 30 having only one hole, the cab mounting bracket 30 actually has a plurality of holes to mount the cab mount.

As illustrated in a plan view in FIG. 2, the cab mounting bracket 30 has a substantially rectangular shape having a front end side 30f, a left end side 30l, a right end side 30r, and a rear end side 30b. The rear end side 30b is inclined leftward (that is, inward in the vehicle width direction) as it goes rearward. In other words, the cab mounting bracket 30 has a dimension in the width direction that decreases toward the rear of the vehicle. The angle of inclination of the rear end side 30b is not uniform, and varies across the width of the vehicle. More specifically, the rear end side 30b includes a bent portion 37 in the middle, which is convex toward the front of the vehicle. The bending angle α of the bent portion 37 (that is, an angle formed by the left side portion and the right side portion with respect to the bent portion 37) may be any angle smaller than 180 degrees, and may be between 170 degrees and 150 degrees, for example. This bent portion 37 is formed to allow the cab mounting bracket 30 to deform before the side rail 12 deforms in an offset collision. This will be described in detail below.

As clearly illustrated in FIGS. 3 and 4, the cab mounting bracket 30 is a combination of an upper bracket 36 and a lower bracket 38. The upper bracket 36 includes a top surface 36t and a peripheral wall 36c extending downward from three peripheral edges of the top surface 36t (front edge, right edge, and rear edge), so that the upper bracket 36, as a whole, has a substantially downwardly opened box shape. The lower bracket 38 similarly includes a bottom surface 38b and a peripheral wall 38c expending upward from three peripheral edges of the bottom surface 38b (front edge, right edge, and rear edge), so that the lower bracket 38, as a whole, has a substantially upwardly opened box shape. The lower bracket 38 has a dimension that is smaller than the upper bracket 36 by an amount corresponding to the thickness of the lower bracket 38, to allow the lower bracket 38 to be fitted inside the upper bracket 36. In other words, the upper bracket 36 and the lower bracket 38 are fitted together such that the peripheral wall 36c of the upper bracket 36 covers the upper edge of the peripheral wall 38c of the lower bracket 38. The peripheral wall 36c of the upper bracket 36 and the peripheral wall 38c of the lower bracket 38 are joined together by welding, for example.

The upper bracket 36 and the lower bracket 38 are disposed such that their left edges (inner ends in the vehicle width direction) sandwich the side rail 12. The left edges of the upper bracket 36 and the lower bracket 38 are joined to the side rail 12 by welding, for example. The left edge (inner end in the vehicle width direction) of the upper bracket 36 is raised upward to correspond to the height of the side rail 12. As is clear from the above description, the cab mounting bracket 30 has a hollow interior. While in this embodiment this hollow space includes no members, reinforcement members called a patch or bulkhead may be disposed within this cavity to reinforce the cab mounting bracket 30. In such a structure, however, it is desirable to dispose the reinforcement member to avoid the bent portion 37 so as not to inhibit deformation of the cab mounting bracket 30 around the bent portion 37.

The abutting member 32 is attached to the front end of the cab mounting bracket 30 to protrude forward of the vehicle. The abutting member 32 is disposed in substantially the center in the vehicle width direction of the cab mounting bracket 30. As illustrated in FIG. 1, the center of the abutting member 32 in the vehicle width direction is located further leftward (inward in the vehicle width direction) with respect to the center of the front-wheel tire 16 in the vehicle width direction.

In a small overlap crash, the front-wheel tire 16 moves rearward to first strike against the abutting member 32. The abutting member 32 has a sufficiently high strength to resist collision against the front-wheel tire 16 and will not deform. Therefore, the collision energy generated by collision of the front-wheel tire 16 against the abutting member 32 will not be absorbed by the abutting member 32. As described above, the abutting member 32 is located further inward in the vehicle width direction with respect to the center of the front-wheel tire 16 in the vehicle width direction. The front-wheel tire 16, upon collision with the abutting member 32, therefore tilts outward in the vehicle width direction about the abutting point, as indicated by the dashed and double-dotted line in FIG. 1. Thus, the abutting member 32 is disposed to direct the impacting object which collides with the abutting member 32 from forward of the vehicle outward in the vehicle width direction.

The load receiving member 34 is disposed further outward in the vehicle width direction with respect to the front edge of the cab mounting bracket 30 and the abutting member 32. In other words, the load receiving member 34 is attached to a corner in the outer front end of the cab mounting bracket 30. The front-wheel tire 16, which impacts against the abutting member 32 and tilts outward, hits on the load receiving member 34, which thus receives the impact load.

The load receiving member 34 includes a coupling member 40 and a contact plate 42 fixed to the front end of the coupling member 40. The coupling member 40 has a substantially U shape opened inward in the vehicle width direction, and is disposed to sandwich the top and the bottom of the cab mounting bracket 30 with its top surface and a bottom surface, respectively. The top surface and the bottom surface of the coupling member 40 are joined to the cab mounting bracket 30 by welding, for example. The contact plate 42 is a board joined to the front end of the coupling member 40 by welding, for example. The contact plate 42 extends further outward in the vehicle width direction with respect to the front end face of the cab mounting bracket 30. The structure including such a contact plate 42 has a larger area against which an impacting object coming from forward, such as the front-wheel tire 16, collides than a structure without the contact plate 42, thereby receiving the impact load more reliably.

Figure 7:
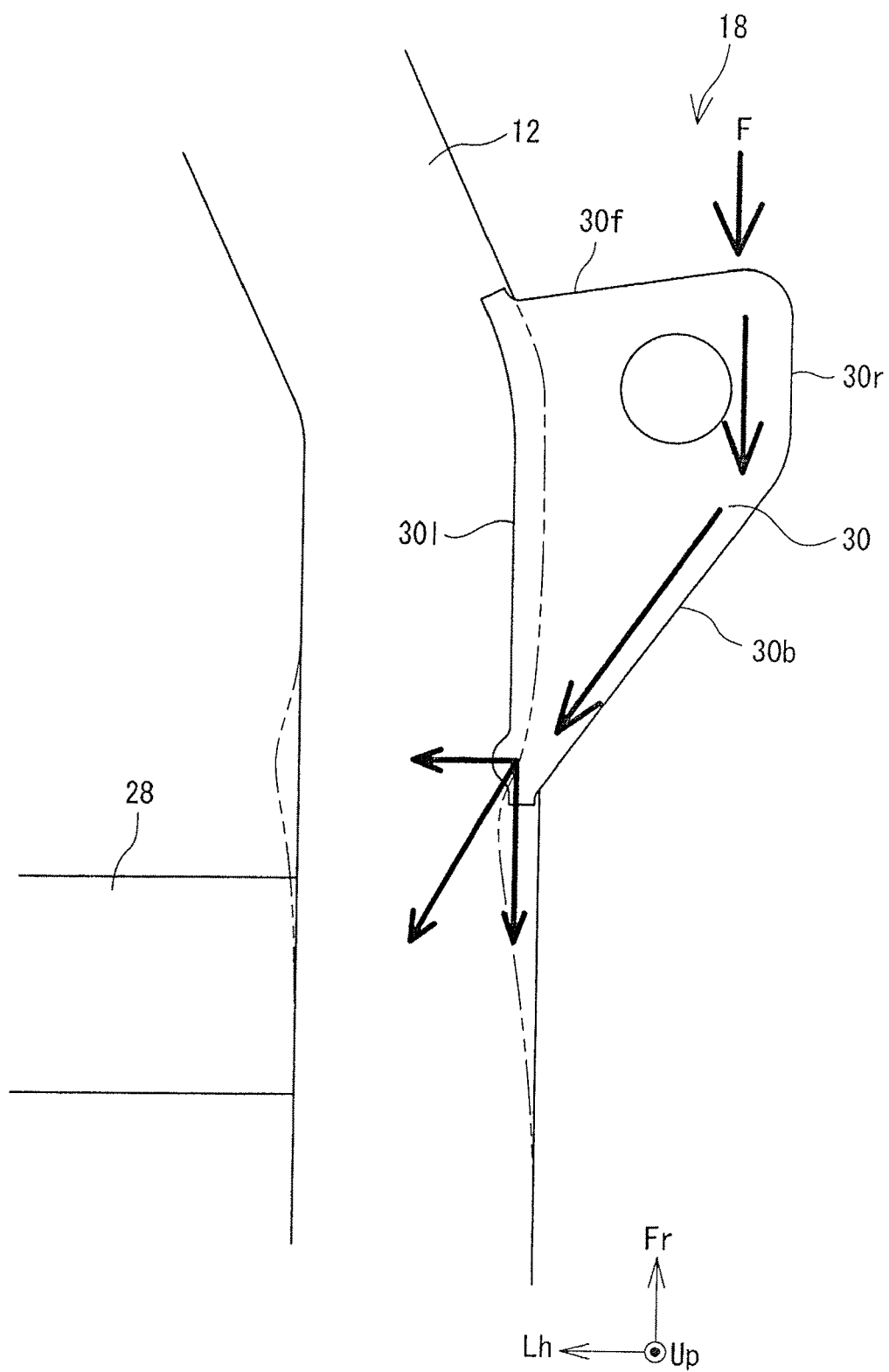
FIG. 7 illustrates an example conventional frame structure.

The behavior of a vehicle in a small overlap crash in which an impacting object partially laps on and impacts against a front face of the vehicle will be described by comparing the structure of the disclosure and a related art structure. FIG. 7 is a diagram illustrating an example related art frame structure. As illustrated, a related art outrigger 18 also includes a cab mounting bracket 30 mounted on the side rail 12. As illustrated in FIG. 7, the cab mounting bracket 30, in a plan view, has a substantially rectangular shape including a front end side 30f, a left end side 30l, a right end side 30r, and a rear end side 30b, with the rear end side 30b being inclined leftward (inward in the vehicle width direction) as it advances rearward. However, the related art cab mounting bracket 30 does not include a bent portion 37 in the rear end side 30b, and the angle of inclination of the rear end side 30b is substantially uniform.

In this related art structure, when the front-wheel tire 16, for example, impacts against the front end of the cab mounting bracket 30 in a frontal crash, the impact load is transmitted to the rear end of the cab mounting bracket 30, and is further transmitted, via the rear end face of the cab mounting bracket 30, to the side rail 12, as indicated by arrows in FIG. 7. In the related art frame structure, the impact load transmitted to the side rail 12, which contains a component in the vehicle width direction, may cause the side rail 12 to be partially bent inward in the vehicle width direction.

Figure 8:
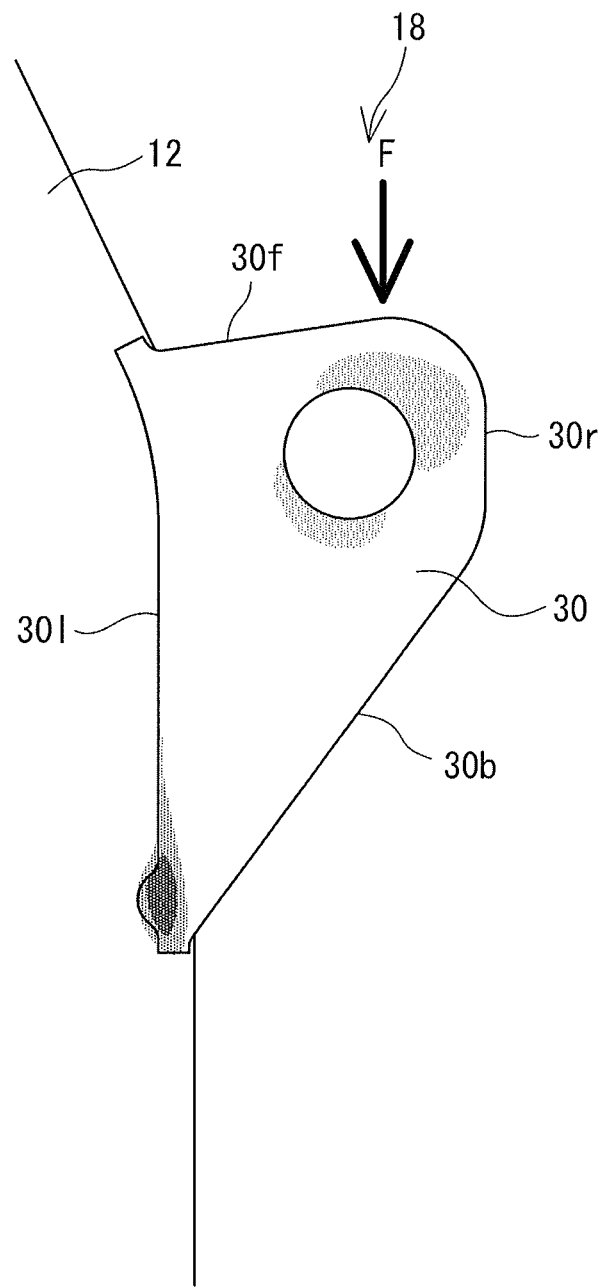
FIG. 8 is a diagram illustrating a distribution of stress generated in a crash in the conventional frame structure.

FIG. 8 illustrates a distribution of stress generated in a crash in the related art frame structure. In FIG. 8, shaded portions indicate portions with concentrated stress, with more intense color indicating higher stress. As illustrated in FIG. 8, in the related art frame structure, the stress is concentrated around a portion of the cab mounting bracket 30 where the rear end side 30b and the side rail 12 intersect (hereinafter referred to as "intersection"). Such concentration of the stress in the intersection made the side rail 12 more likely to break.

To prevent such a break of the side rail 12, it has been proposed to place a reinforcement member called a bulkhead in the side rail 12. This structure prevents the side rail 12 from being broken and disperses the impact load into the rear of the side rail 12 and the cross member 24. This structure, however, increases the weight and costs by an amount corresponding to the reinforcement member.

To avoid such a problem, in the present embodiment, the cab mounting bracket 30 (outrigger 18) includes the bent portion 37 along the rear end side 30b such that the rear end side 30b is bent such that the bent portion 37 is convex toward the front of the vehicle. The cab mounting bracket 30 including the bent portion 37, that is, a weakened portion, is likely to deform when the impact load is input, because of stress concentrated in the bent portion 37. The cab mounting bracket 30, which is deformed, absorbs the collision energy and reduces the impact load to be transmitted to the side rail 12, efficiently reducing the break of the side rail 12.

Figure 5:
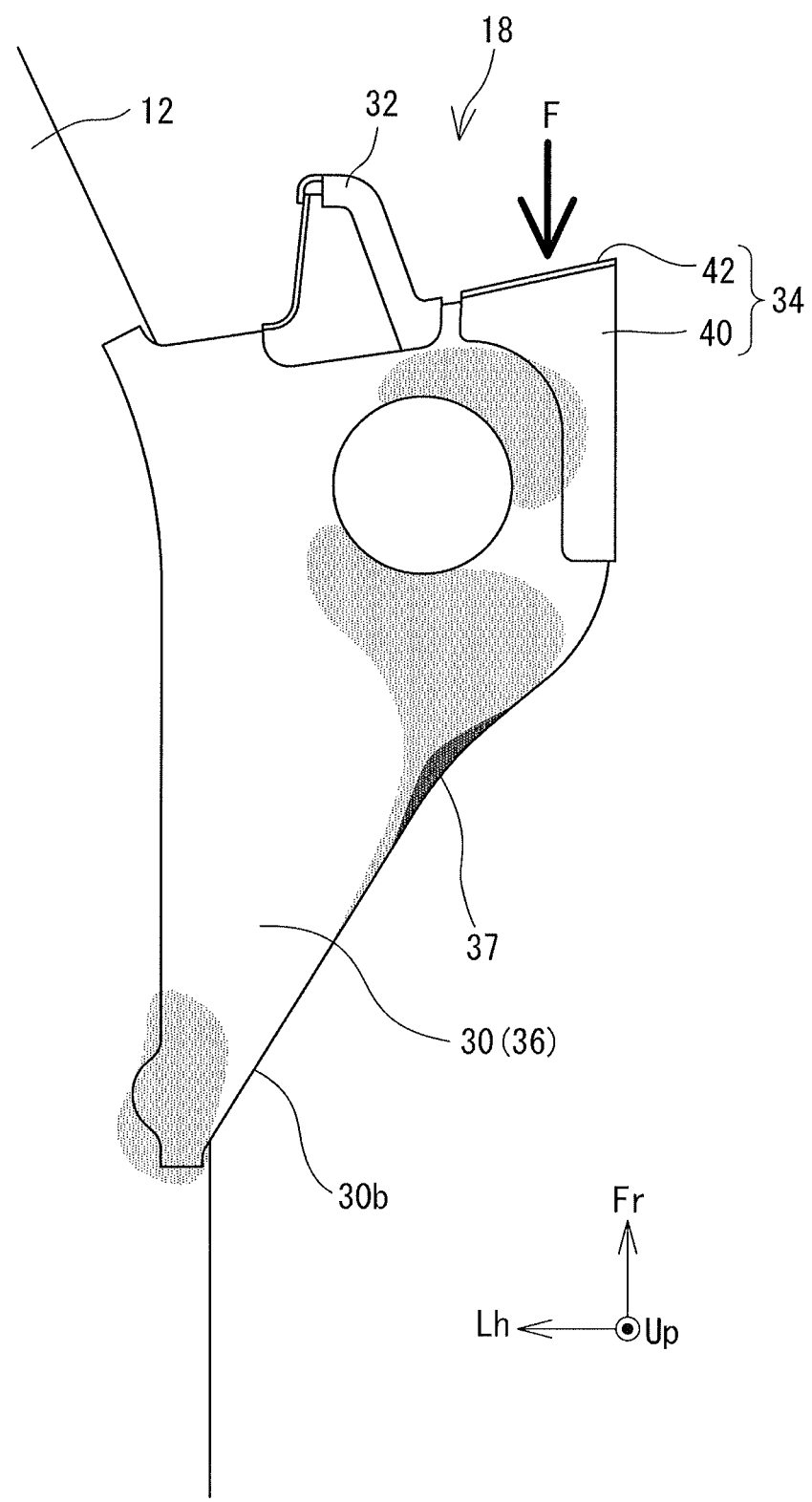
FIG. 5 is a conceptual drawing illustrating a distribution of stress when impact load is applied to a cab mounting bracket.

FIG. 5 is a conceptual drawing showing a distribution of stress when impact load F is applied, via the load receiving member 34, to the cab mounting bracket 30. As is clearly shown in FIG. 5, large stress is generated around the bent portion 37. The stress is also generated around the crossing, but is significantly smaller compared to the structure without the bent portion 37 (the example illustrated in FIGS. 7 and 8).

Figure 6:
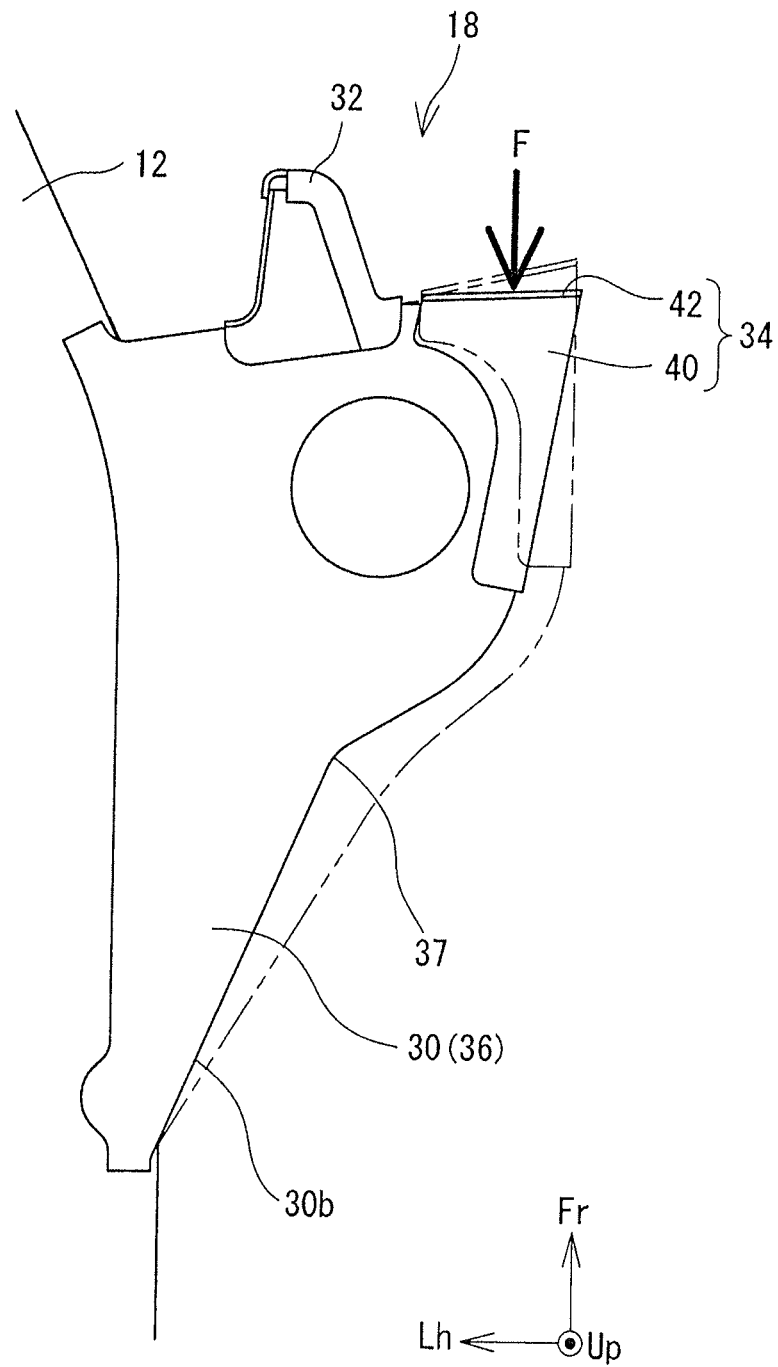
FIG. 6 is a conceptual drawing illustrating deformation of the cab mounting bracket upon receiving impact load.

FIG. 6 is a conceptual drawing illustrating deformation of the cab mounting bracket 30 when the impact load F is applied to the cab mounting bracket 30. As illustrated in FIG. 6, application of the impact load F to the cab mounting bracket 30 via the load receiving member 34 causes the cab mounting bracket 30 to deform such that the bending angle a of the bent portion 37 is decreased. This deformation allows the collision energy to be absorbed, reducing the impact load to be transmitted to the side rail 12. Consequently, break of the side rail 12 is efficiently prevented.

As described above, the vehicle frame structure 10 of the present disclosure prevents break of the side rail 12 which includes no reinforcement members. This structure prevents bending of the side rail 12 while reducing an increase in costs and weight of a vehicle.

To allow the cab mounting bracket 30 to deform in the bent portion 37, it is desirable to input the impact load F to the cab mounting bracket 30 at a location further outward in the vehicle width direction with respect to the bent portion 37. In this embodiment, to shift the input location of the impact load F further outward in the vehicle width direction with respect to the bent portion 37, the abutting member 32 is attached to the front end face of the cab mounting bracket 30.

More specifically, in an offset collision, the front-wheel tire 16 strikes against the front end of the outrigger 18. Without the abutting member 32, the front-wheel tire 16 would hit the entire front face of the cab mounting bracket 30, which would partially move the impact load F further inward in the vehicle width direction with respect to the bent portion 37. This makes the bent portion 37 less likely to deform.

In the present embodiment, the abutting member 32 is formed to protrude from the front face of the cab mounting bracket 30. This structure causes the front-wheel tire 16 moving rearward to be directed diagonally outward in the vehicle width direction after striking against the abutting member 32. Consequently, the impact load F is input to the cab mounting bracket 30 at a location further outward in the vehicle width direction with respect to the abutting member 32, and also further outward in the vehicle width direction with respect to the bent portion 37. This makes the bent portion 37 more likely to deform, absorbing the collision energy more reliably.

In the present embodiment, the load receiving member 34 is disposed on the front end of the cab mounting bracket 30. This structure increases a surface opposing the front-wheel tire 16 to receive the load more reliably. Specifically, the cab mounting bracket 30 having a front end face and a side end face that are continuous, includes an arc-shaped corner at the outer front end and has a small surface opposing the front-wheel tire 16. In contrast, the load receiving member 34, including the contact plate 42 forming the front end face and the coupling member 40 forming the side end face separately, has an outer front end corner which is a sharp shape without radius. The cab mounting bracket 30 having the load receiving member 34 of such a shape on the outer front end corner has a larger surface opposing the front-wheel tire 16 compared to the cab mounting bracket 30 without the load receiving member 34. This allows the impact load from the front-wheel tire 16 to be input to the cab mounting bracket 30 more reliably and to be absorbed in the cab mounting bracket 30 more reliably.

While an example structure has been described, the outrigger 18 (cab mounting bracket 30) including the bent portion 37 which is convex toward the front of the vehicle, formed in the middle of the rear end side 30b, may be modified as appropriate. For example, while, in the above example, the side rails 12 are bent in the middle, the side rails 12 may have a straight shape without bending. Further, the abutting member 32 and the load receiving member 34 may be omitted in any structures which allow a sufficiently large load to be applied to a portion of the cab mounting bracket 30 which is further outward in the vehicle width direction with respect to the bent portion 37.

REFERENCE SIGNS LIST 10 vehicle frame structure, 12 side rail, 12b rail rear portion, 12d rail slope portion, 12f rail front portion, 16 front-wheel tire, 18 outrigger, 20 suspension mounting bracket, 22, 24, 26, 28 cross member, 30 cab mounting bracket, 32 abutting member, 34 load receiving member, 36 upper bracket, 37 bent portion, 38 lower bracket, 40 coupling member, 42 contact plate.

The invention claimed is:
1. A vehicle frame structure, comprising:
   a pair of side rails extending along a length of a vehicle at an interval in a width direction of the vehicle; and outriggers coupled to the side rails, respectively, to protrude further outward in the vehicle width direction with respect to the respective side rails, the outriggers each comprising a cab mounting bracket joined to a corresponding one of the side rails, the cab mounting bracket comprising a rear end side that is inclined inward in the vehicle width direction as the rear end side goes rearward of the vehicle, the cab mounting bracket further comprising, in a middle of the rear end side, a bent portion which is bent to be convex toward the front of the vehicle.

2. The vehicle frame structure according to claim 1, wherein
each of the side rails has a substantially crank shape comprising a rail front portion extending along the length of the vehicle, a rail rear portion disposed further outward in the vehicle width direction with respect to the rail front portion to extend along the length of the vehicle, and a rail slope portion extending diagonally to connect the rail front portion and the rail rear portion, and
the cab mounting bracket is joined to the corresponding one of the side rails such that a front end of the cab mounting bracket is positioned near a corner formed by the rail slope portion and the rail rear portion.

3. The vehicle frame structure according to claim 1, wherein
the outriggers each further comprise an abutting member protruding forward of the vehicle from the front end of the cab mounting bracket.

4. The vehicle frame structure according to claim 3, wherein
the abutting member has a center in the vehicle width direction that is located further inward in the vehicle width direction with respect to a center of a front-wheel tire in the vehicle width direction.

5. The vehicle frame structure according to claim 1, wherein
the outriggers each further comprise a load receiving member coupled to the cab mounting bracket, the load receiving member including a contact plate extending further outward in the vehicle width direction with respect to a front end face of the cab mounting bracket at a location further forward with respect to the front end face.

* * * * *